United States Patent

Moser et al.

[11] 4,283,520
[45] Aug. 11, 1981

[54] STORAGE-STABLE, HOMOGENEOUS MIXTURE CONTAINING EPOXIDE RESIN, CURING AGENT AND CURING ACCELERATOR, AND THE USE OF THE MIXTURE FOR PRODUCING CURED PRODUCTS

[75] Inventors: Roland Moser, Basel; Alfred Renner, Münchenstein, both of Switzerland

[73] Assignee: Ciba-Geigy Corporation, Ardsley, N.Y.

[21] Appl. No.: 140,403

[22] Filed: Apr. 14, 1980

[30] Foreign Application Priority Data

Apr. 20, 1979 [CH] Switzerland .................. 3747/79

[51] Int. Cl.³ ...................... C08G 59/42; C08G 59/46
[52] U.S. Cl. .......................... 528/93; 528/94; 528/119; 528/120; 528/362
[58] Field of Search ................ 528/93, 94, 119, 120, 528/362

[56] References Cited

U.S. PATENT DOCUMENTS

| | | | |
|---|---|---|---|
| 3,386,956 | 6/1968 | Nawakowski et al. | 260/47 |
| 3,470,132 | 9/1969 | Ernst et al. | 260/47 |
| 3,519,604 | 7/1970 | Maurer | 260/47 |
| 3,530,093 | 9/1970 | Maurer | 260/47 |
| 3,530,095 | 9/1970 | Porret et al. | 260/47 |
| 3,759,914 | 9/1973 | Simms et al. | 260/37 EP |
| 3,764,584 | 10/1973 | Hope et al. | 260/78.4 EP |
| 3,849,366 | 11/1974 | Patrick | 260/37 EP |
| 3,956,237 | 5/1976 | Doorakian et al. | 528/93 |
| 4,202,920 | 5/1980 | Renner et al. | 528/94 X |

FOREIGN PATENT DOCUMENTS

| | | |
|---|---|---|
| 1153639 | 5/1969 | United Kingdom . |
| 1260896 | 1/1972 | United Kingdom . |
| 1293142 | 10/1972 | United Kingdom . |
| 1346769 | 2/1974 | United Kingdom . |

*Primary Examiner*—Earl A. Nielson
*Attorney, Agent, or Firm*—Luther A. R. Hall

[57] ABSTRACT

A mixture of (a) epoxide resin, (b) a cyanoacetyl compound of the formula

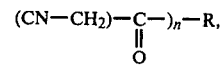

wherein R is the radical of an alcohol or ether, and n is 1-4, as curing agent, and (c) a phenylurea derivative, such as monuron, as curing accelerator is characterized by good storage stability. The mixture can be used as casting resin, laminating resin, adhesive, surface-protective agent and moulding material, and the mixture yields, on being heated, cured products having homogeneous and good mechanical properties.

13 Claims, No Drawings

STORAGE-STABLE, HOMOGENEOUS MIXTURE CONTAINING EPOXIDE RESIN, CURING AGENT AND CURING ACCELERATOR, AND THE USE OF THE MIXTURE FOR PRODUCING CURED PRODUCTS

The invention relates to a storage-stable, homogeneous mixture of epoxide resin, curing agent for use with it and curing accelerator, that is to say, a so-called "one-component system", which can also contain fillers. The invention relates also to the use of this mixture for producing cured products.

"One-component systems" consisting of epoxide resins, curing agents and optionally curing accelerators are known. Mixtures of epoxide resin and boron fluoride amine or boron chloride amine complexes are used in practice (see G.B. Patent Specification No. 1,346,769), also mixtures of epoxide resins as free as possible from hydroxyl groups, and cyclic dicarboxylic anhydrides and basic accelerators, such as benzyldimethylamine (see U.S. Pat. No. 3,470,132) or 1-methylimidazole (see U.S. Pat. No. 3,764,584). Also known are hot-curable homogeneous mixtures of epoxide resin and cyclic urea derivatives, such as ethylene urea, as storage-stable one-component systems (see U.S. Pat. No. 3,530,095).

As an alternative to the homogeneous systems, there are also used two-phase systems, whereby a curing agent which is difficultly soluble at room temperature and optionally an accelerator are dispersed in the epoxide resin, for example dispersions of dicyandiamide on its own or together with a monoaminopyridine (see U.S. Pat. No. 3,530,093), or with a urea derivative, such as monuron (see U.S. Pat. No. 3,386,956).

Furthermore, there are also known systems in which insoluble accelerators are added as finely dispersed as possible to homogeneous epoxide resin/curing agent mixtures wherein the curing agent is a polycarboxylic acid anhydride (see U.S. Pat. No. 3,519,604).

Finally, one-phase and two-phase combinations of epoxide resins, a curing agent based on acid anhydride, polyphenol or polyamine, and a phenylurea derivative, such as monuron, as accelerator are known from the G.B. Patent Nos. 1,153,639 and 1,260,896, as well as from the U.S. Pat. No. 3,759,914 and the German Offenlegungsschrift No. 2,257,070. In the two last-mentioned publications, there is described for example the use of dicyandiamide or cyanacetamide.

The systems mentioned do have a certain degree of storage-stability, this being however inadequate for many applications of the mixtures. In the case of the poly-phase systems, there is the additional disadvantage that during storage or processing of the mixtures there can occur sedimentation of the undissolved particles of curing agent and/or accelerator, as a result of which the cured products are inhomogeneous and have poor mechanical properties.

It has now been found that a specific homogeneous mixture of epoxide resin, curing agent and accelerator gives hot-curable systems which have higher storage-stability with equally good reactivity, and which yield cured products having very suitable properties. The mixture according to the invention contains (a) an epoxide resin having on average more than one epoxide group in the molecule,
(b) as a curing agent for the epoxide resin, a cyanoacetyl compound dissolved in the resin, which compound has a melting point (m.p.) below 120° C. and corresponds to the formula I

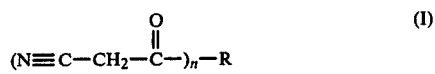

wherein R is the radical of a mono- to tetravalent alcohol or amine having a partial molecular weight of $\leq 2000$, which radical is formed by removal of 1 to 4 hydroxyl hydrogen atoms or amine hydrogen atoms, and n is a number from 1 to 4 inclusive, the amount of (b) being such that to 1—$CH_2$—$C\equiv N$ group there are 3–4 epoxide groups of the component (a), and
(c) as a curing accelerator, to 100 parts by weight of epoxide resin 0.1 to 10 parts by weight of a phenylurea derivative of the formula II

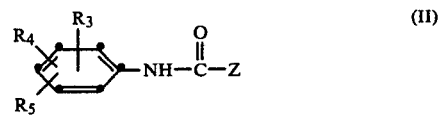

in which Z is the group

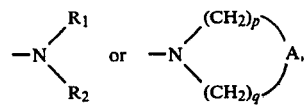

wherein A is —$CH_2$— or N, p is 0, 1 or 2, and q is 1 or 2, and $R_1$ and $R_2$ independently of one another are each an alkyl group having 1 to 4 carbon atoms, and wherein $R_3$ and $R_4$ independently of one another are each hydrogen, halogen, alkyl having 1 to 4 carbon atoms, alkoxy having 1 to 4 carbon atoms, or a substituted or unsubstituted phenyl or phenoxy group, and $R_5$ is hydrogen, trifluoromethyl, nitro or one of the groups

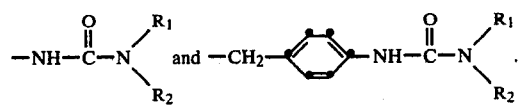

Suitable epoxide resins (a) are in particular the known liquid aliphatic, aromatic and heterocyclic polyepoxides, preferably those based on polyvalent phenols, such as bis-(4-hydroxyphenyl)-2,2-propane or 4,4'-dihydroxydiphenylmethane (bisphenol A or F), on polyvalent aliphatic alcohols or aromatic mono- or polyamines, such as amonophenols. Particularly preferred are liquid unmodified epoxide resins based on bisphenol-A, for example those having an epoxide content of 5.4 equivalents per kg and a viscosity of about 10500 mPa s at 25° C.

Especially suitable cyanoacetyl compounds (b) are those of the formula I wherein n is the number 1 or 2. The following compounds may for example be mentioned:

A:
$$NC-CH_2-COO-CH_2-\underset{\underset{CH_3}{|}}{\overset{\overset{CH_3}{|}}{C}}-CH_2-OOC-CH_2-CN$$

neopentyl glycol-bis-cyanoacetic acid ester    m.p. = 37–39° C.

B:
$$NC-CH_2-CO-NH-CH_2-CH\begin{array}{c}CH_3\\ \diagup\\ \diagdown\\ CH_3\end{array}$$

cyanoacetic acid-N-isobutylamide    m.p. = 40° C.

C: $NC-CH_2-COO-(CH_2)_6-OOC-CH_2CN$
hexamethylene-(1,6)-bis-cyanoacetate    m.p. = 71–73° C.

D:
$$NC-CH_2-COO-CH_2-\langle\text{cyclohexane}\rangle-CH_2-OOC-CH_2-CN$$

1,4-cyclohexanedimethanol-bis-cyanoacetate
(cis-trans isomeric mixture), softening point (s.p.) = 85–90° C.

E:
$$NC-CH_2-COO-CH_2-CH_2-O-\langle\text{Ar}\rangle-\underset{\underset{CH_3}{|}}{\overset{\overset{CH_3}{|}}{C}}-\langle\text{Ar}\rangle-O-CH_2-CH_2-OOC-CH_2-CN$$

2,2-[4,4'-di-cyanoacetoxyethoxy-phenyl]-propane;
viscosity at 80° C.: 1.36 Pa s, at room temperature
highly viscous.

F: $NC-CH_2-COO-CH_2-CH_3$
cyanoacetic acid ethyl ester    liquid

G: $NC-CH_2-COO-C_4H_9$    liquid at room temperature (RT)

H: $NC-CH_2-COO-CH_2-\underset{\underset{C_2H_5}{|}}{CH}-C_4H_9$    liquid at RT I:
$$NC-CH_2-COO-CH_2-\langle\text{Ph}\rangle$$    liquid at RT K: $NC-CH_2-COO-(CH_2)_2-OOC-CH_2-CN$
resin, liquid at RT L: $NC-CH_2-COO(CH_2)_4-OOC-CH_2-CN$    m.p. = 39–42° C.

M:
$$NC-CH_2-COO-\langle\text{Ar}\rangle-\underset{\underset{CH_3}{|}}{\overset{\overset{CH_3}{|}}{C}}-\langle\text{Ar}\rangle-OOC-CH_2-CN$$

resin, viscosity at 80° C.: 1.44 Pa s

N:
$$NC-CH_2-COO-CH_2-\langle\text{indane}\rangle-CH_2-O-CO-CH_2-CN \quad\text{resin: }\mu_{25}\text{:}10.4\text{ Pa s}$$

O: $NC-CH_2-COO(CH_2-CH_2-O)_4OC-CH_2-CN$    $n\frac{\alpha}{D}$ : 1,5040   liquid P: $CH_3-CH_2-C(CH_2O-CO-CH_2CN)_3$    resin; viscosity at 25° C. 56,8 Pa s; $n\frac{\alpha}{D}$ : 1,4813

Q:
$$NC-CH_2-\underset{\underset{O}{\|}}{C}-O-CH_2-\underset{\underset{CH_3}{|}}{\overset{\overset{CH_3}{|}}{C}}-CH_2-[O-\underset{\underset{O}{\|}}{C}-\langle\text{Ar}\rangle-\underset{\underset{O}{\|}}{C}-O-CH_2-\underset{\underset{CH_3}{|}}{\overset{\overset{CH_3}{|}}{C}}-CH_2]_4-O-\underset{\underset{O}{\|}}{C}-CH_2-CN$$

s.p. = 60° C.; b.p.$_{13.3Pa}$ = 101–103° C.
$n\frac{\alpha}{D}$ : 1,4657

R: $NC-CH_2-CO-NH-CH_3$    m.p. = 98–100° C.
S: $NC-CH_2-CO-N(C_2H_5)_2$    liquid T:
$$NC-CH_2-CO-NH-CH_2-CH\begin{array}{c}C_4H_9\\ \diagup\\ \diagdown\\ C_2H_5\end{array}$$

b.p.$_{13.3Pa}$:131–133° C.; $n\frac{\alpha}{D}$ : 1.4674; viscosity 25° C.: 0.235 Pa s U:
$$NC-CH_2CONH(CH_2)_3\cdot N\begin{array}{c}CH_3\\ \diagup\\ \diagdown\\ CH_3\end{array}\quad\text{b.p.}_{13.3Pa}\text{:105–107° C.}$$

V:
$$NC-CH_2-CO-NH(CH_2)_3\cdot N\begin{array}{c}C_2H_5\\ \diagup\\ \diagdown\\ C_2H_5\end{array}\quad\text{b.p.}_{53Pa} = 134°\text{ C.; }n\frac{\alpha}{D}\text{ : 1,4801}$$

$n\frac{\alpha}{D}$ : 1,4762; $\mu_{25}$: 0,140 Pa s

-continued

W: NC—CH₂—CONH(CH₂)₃—O—(CH₂)₄—O—(CH₂)₃—NH—COCH₂CN    $\mu_{25} = 0.125$ Pa s    liquid X: NC—CH₂CON(C₄H₉)₂    b.p.$_{53Pa}$:150–154° C.;n$\frac{\alpha}{D}$ ; 1.4604

$\mu_{25}$ : 0.037 Pa s

Y: NC—CH₂—CO—NH—C₂H₅    m.p. = 61–62° C.

Z:     m.p. = 87° C.

NC—CH₂—CO—N⟨O⟩

A':
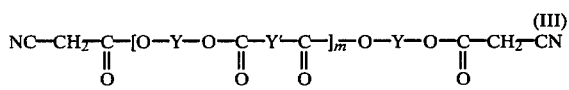

NC—CH₂—CONH—CH₂—CH(CH₃)—CH₂—C(CH₃)₂—CH₂—CH₂—NH—CO—CH₂—CN
                                    |
                                   CH₃

B':   H₃C      NH—CO—CH₂—CN    soft resins with s.p. at room temperature
      H₃C⟩⟨
      H₃C   CH₂NHCOCH₂CN The cyanoacetyl compounds A and B are particularly preferred.

Higher molecular cyanoacetic acid derivatives can correspond to the formula III $$NC-CH_2-\underset{\underset{O}{\|}}{C}-[O-Y-O-\underset{\underset{O}{\|}}{C}-Y'-\underset{\underset{O}{\|}}{C}-]_m-O-Y-O-\underset{\underset{O}{\|}}{C}-CH_2-CN \quad (III)$$

wherein Y is a radical of glycol, for example of ethylene glycol, propylene glycol, butanediol-1,4, hexanediol-1,6, and so forth, and Y' is a dicarboxylic acid radical, for example phthalic acid, isophthalic acid, adipic acid, and so forth, and m is a number from 2 to 20 inclusive.

The higher-molecular cyanoacetyl compounds (b) are produced, using known processes, by obtaining (either in the melt or in solution with azeotropic removal of the water formed during the reaction) from dicarboxylic acids or anhydrides thereof and excess glycols firstly polyesters having terminal hydroxyl groups, and subsequently reacting these with cyanoacetic acid or with ethyl or methyl esters thereof, in the manner already described for the production of cyanoacetic esters of higher and polyvalent alcohols.

Suitable phenylureas (c) are preferably those of the formula II in which Z is the group $$-N\begin{matrix}R_1\\ \diagdown\\ R_2\end{matrix}$$

wherein $R_1$ and $R_2$ independently of one another are each the methyl or ethyl group, $R_3$ and $R_4$ independently of one another are each hydrogen, halogen alkyl having 1 to 4 carbon atoms, or alkoxy having 1 to 4 carbon atoms, and $R_5$ is hydrogen or trifluoromethyl. N-p-trifluoromethylphenyl-N',N'-dimethylurea is preferred, and N-p-chlorophenyl-N',N'-dimethylurea (=monuron) and N-p-ethyloxyphenyl-N',N'-dimethylurea are particularly preferred. This component is preferably used in an amount of 0.1 to 5 parts by weight to 100 parts by weight of epoxide resin.

The mixture according to the invention can be produced by simply bringing the components together and carefully heating the materials until the accelerator dissolves. If the epoxide resin is solid, it is temporarily heated until melted, and the curing agent and the accelerator are dissolved therein.

It is possible to add to the mixture also fillers, extenders, reinforcing agents, pigments and other additives customary for the respective application, for example minerals, wood flour, glass fibres, carbon fibres or boron fibres, polyamides, polyesters, carbon black and metal oxides.

The mixtures can be used in the widest variety of commercial fields, for example as casting resins (also filled with mineral substances), laminating resins, adhesives, preparations for surface protection and, with the use of solid epoxide resins, also as moulding materials. They are preferably used as casting resins, laminating resins and adhesives. Cured products can be produced by heating mixtures according to the invention to a temperature of above 100° C.

It is surprising that the cyanoacetic acid derivatives of the formula I are effective as curing agents, and that the storage stability of a mixture of 3 components is in some cases even better that that of the known mixtures of epoxide resin and monuron.

PRODUCTION OF THE CYANOACETYL COMPOUNDS USED IN THE EXAMPLES

A: Neopentyl glycol-bis-cyanoacetic acid ester

In a flask provided with stirrer, Hahn head, reflux condenser and thermometer, 714 parts of cyanoacetic acid, 416 parts of neopentyl glycol and 1200 parts of toluene are heated to boiling. The water formed during esterification is separated in the Hahn head, and the toluene returns to the reaction vessel. After 12 hours of azeotropic esterification, 134 parts by volume of water are collected. The toluene is afterwards distilled off in vacuo, and the residue is fractionated at 13.3 Pa. Between 165° and 181° C., 729 parts (76.5% of theory) of pure neopentyl glycol-bis-cyanoacetic acid ester having the following elementary composition pass over:

|       | calculated for $C_{11}H_{14}N_2O_4$ | found |
|-------|-------------------------------------|-------|
| % C:  | 55.46                               | 55.3  |
| % H:  | 5.93                                | 6.2   |
| % N:  | 11.76                               | 11.8  |
| % O:  | 26.87                               | 27.3  |

B: Cyanoacetic acid-N-isobutylamide 452 parts of cyanoacetic acid ethyl ester and 306 parts of isobutylamine are reacted for 6 hours at 35°±3° C. The alcohol formed during the amidation reaction is afterwards drawn off at 80° C. in vacuo in a rotary evaporator, and the residue is rectified.

b.p.$_{0.3}$ = 126°–132° C.; yield: 436 parts (95% of theory).

|     | calculated for $C_7H_{12}N_2O$ | found |
|-----|-----|-----|
| % C: | 59.98 | 59.7 |
| % H: | 8.63 | 8.6 |
| % N: | 19.99 | 19.5 |
| % O: | 11.42 | 11.5 |

Both products (A and B) crystallise after standing for some time: m.p. about 40° C.

The compounds C to F inclusive are produced in a similar manner by azeotropically esterifying cyanoacetic acid with hexanediol in the case of C, and cyanoacetic acid with 1,4-cyclohexanedimethanol in the case of D; E is produced by reacting bisphenol A-di-hydroxyethyl ether, in the presence of catalytic amounts of butyl titanate, with cyanoacetic ester; and F is produced in a known manner.

The production of the phenylurea derivatives used as accelerators is known. Reference may be made for example to the G.B. Pat. Nos. 1,153,639 and 1,293,142, and to the U.S. Pat. Nos. 3,386,956 and 3,759,914.

COMMENTS REGARDING THE FOLLOWING EXAMPLES (a) General instruction for producing the mixtures Epoxide resin, curing agent component and optionally accelerator are mixed, in the respective proportions shown in the Tables, at room temperature or if necessary at slightly elevated temperature (40 to a maximum of 80° C.), and are stirred until a clear homogeneous solution is obtained. The mixing of the components can be carried out in the given sequence or in any other possible sequence.

(b) For determination of the storage-stability of the mixtures, a portion thereof is stored at 25° C. in sealed glass flasks, and from time to time the viscosity is measured (Hoeppler scleroscope hardness test method). The mixtures are considered no longer usable when the viscosity on storage has more than doubled, or when—in the case of in general very low-viscous mixtures—a viscosity of 20,000 mPa at 25° C. is exceeded.

(c) For determination of reactivity there is used as a criterion the measurement of the gelling time at various temperatures. A drop of the mixture to be tested is applied to the centre of a hot plate adjusted to the desired temperature, and the time until gelling of the specimen occurs is determined.

(d) Determination of the moulded-material properties and film properties

For this purpose, there are firstly cast, in aluminium moulds, moulded-material sheets having the dimensions 130×130×4 mm, which are then cured under the conditions given in the Tables, and subsequently broken down into test specimens 60×10×4 mm in size for determination of the most important mechanical properties according to the (VSM) standard of the Association of Swiss Machine Manufacturers. A test piece taken from a specimen of this kind serves also for the calorimetric determination of the glass transition temperature (GTT) by means of differential thermoanalysis. The GTT enables conclusions to be drawn regarding the dimensional stability under heat to be expected. A remaining portion of the mixtures can be used finally to bond test strips of Anticorodal B (dimensions 170×25×1.5 mm) with a 12 mm overlap, and to coat cleaned strips of sheet iron, using a triangular blade, with a 50 μm thick layer. The test specimens thus obtained for determining the adhesive properties (tensile strength) are also cured under the conditions shown in the Tables.

EXAMPLE 1

The Example illustrates the effect of increasing amounts of N-p-chlorophenyl-N',N'-dimethylurea on a combination consisting of a liquid unmodified epoxide resin from bisphenol A and neopentyl glycol-bis-cyanoacetic ester as curing agent.

The results obtained from the determination of the gelling time and of storage-stability are summarised in Table Ia. They show that the gelling time at elevated temperature can be very greatly reduced by the addition of N-p-chlorophenyl-N',N'-dimethylurea (monuron) as accelerator, without this reduction at the same time being associated with any marked shortening of storage-stability. The storage-stability is in this case surprisingly even better than that with a combination of a diglycidyl compound based on bisphenol-A and the accelerator alone, without the addition of neopentyl glycol-bis-cyanoacetic ester.

Table 1b shows the effectiveness of the accelerator on the basis of the properties of moulded materials and films. Without accelerator, no usable moulded materials are obtained after a curing time of 12 hours at 120° C., whereas both with 2 and with 5 parts by weight of accelerator to 100 parts by weight of epoxide resin, the moulded materials and films have favourable properties.

Table 1c illustrates that a combination of unmodified epoxide resin from bisphenol-A and a curing agent/accelerator mixture according to the invention has excellent storage-stability also when in solution.

Accordingly, the combination according to the invention renders possible the formulation of storage-stable one-component systems which at elevated temperature have, compared with the formulation without accelerator, the advantage of a greatly reduced gelling time, and which moreover can be cured at a lower temperature and/or in a shorter time.

Mention may be made by way of comparison that with the use of customary accelerators, such as benzyldimethylamine and 1-methylimidazole, the storage-stability is considerably lower, even when using smaller amounts of accelerator, which are also selected that the gelling time at 180° C. is approximately equally long and corresponds to that using an amount of 2 phr of monuron.

| viscosity in mPa s | 0.4 phr of benzyl-dimethylamine | 0.2 phr of 1-methyl-imidazole |
|-----|-----|-----|
| viscosity at 25° C. | 5850 | 5475 |
| viscosity after 3 days at 25° C. | 18225 | 9300 |
| viscosity after 30 days at 25° C. | solid, m.p. 62° C. | solid, m.p. 50° C. |

TABLE 1a

Effect of increasing proportions of accelerator on the reactivity and storage stability of a mixture of epoxide resin and neopentyl glycol-bis-cyanoacetic ester.

| resin component | unmodified epoxide resin from bisphenol-A [epoxide content 5.4 equiv./kg, viscosity (25° C.) 10500 mPa s] | | | | | |
|---|---|---|---|---|---|---|
| curing agent component | 21.5 parts by weight of neopentyl glycol-bis-cyanoacetic ester to 100 parts by weight of epoxide resin (phr) | | | | | 0 |
| accelerator | N-p-chlorophenyl-N',N'-dimethylurea (monuron) | | | | | |
| amount of accelerator (parts by wt. to 100 parts by wt. of resin = phr) | — | 0,5 | 1 | 2 | 5 | 2 |
| gelling time at 180° C. | >2 h | 55 min. | 24 min. | 15 min. | 7 min. 10 sec. | 1 h 55 min. |
| gelling time at 120° C. | | | | 2 h 30 min. | 1 h 50 min. | |
| viscosity at 25° C. (mPa s) | 5600 | 5625 | 5625 | 5720 | 6450 | 10530 |
| viscosity at 25° C.(mPa s) after X days storage at 25° C. | | | | | | |
| X = 3 | | | | 5720 | | |
| X = 30 | 5600 | 5775 | 5775 | 5070 | 6900 | 12740 |
| X = 60 | 5600 | 5775 | 5625 | 4400 | 7725 | 14430 |
| X = 150 | | | | 4700 | | 57600 |
| X = 300 | | | | 6240 | | |

TABLE 1b

Effect of increasing proportions of accelerator on the properties of moulded materials and films from a combination of epoxide resin and neopentyl glycol-bis-cyanoacetic ester.

| | | | |
|---|---|---|---|
| resin component | epoxide resin based on bisphenol-A (as in Table 1a) | | |
| curing agent component | 21.5 phr of neopentyl glycol-bis-cyanoacetic ester | | |
| accelerator | N-p-chlorophenyl-N',N'-dimethylurea (monuron) | | |
| amount of accelerator (phr) | 2 | 5 | 0 |
| curing | 4 h at 80° C. + 12 h at 120° C. | | |
| dimensional stability under haet (ISO-75) | 106° C. | 111° C. | no curing therefore no testing possible |
| glass transition temp. (differential thermoanalysis) | 118° C. | 119° C. | |
| impact bend strength kJ/m² (VSM standard 77105) | 47.5 | 25 | |
| bend strength N/mm² (VSM standard 77103) | 126 | 119 | |
| flexural strength mm (VSM standard 77103) | 10.5 | 12 | |
| tensile shearing strength on Anticorodal N/mm²(DIN 53183) | 18.7 | 14 | |
| increase in weight after 4 days' storage in water at 25° C. | 0.31% | 0.45% | |

ISO = International Standards Organisation
VSM = Verein Schweizerischer Maschinenindustrieller (Association of Swiss Machine Manufacturers)
DIN = Deutsche Industrie-Norm (German Industrial Standards)

| | | |
|---|---|---|
| Appearance after curing in a thin layer on glass | glossy film | glossy film |
| *resistance of thin films to chemicals | | |
| 5 N H$_2$SO$_4$ | 1 | 1 |
| 5 N NaOH | 1 | 1 |
| H$_2$O | 1 | 1 |
| acetone | 2 | 2 |

*1 drop of chemical is left on the film for 1 hour, after which time the assessment is made as follows:
1 = in order
2 = slightly attacked
3 = severely attacked
4 = completely destroyed.

TABLE 1c

Testing of the build-up of viscosity in solution.

| | |
|---|---|
| System | 100 parts of unmodified epoxide resin from bisphenol-A [epoxide content = 5.4 equiv./kg, viscosity (25° C.) 10500 mPa s] 21.5 parts of neopentyl glycol-bis-cyanoacetic ester 2 parts monuron 20 parts of methyl glycol |
| gelling time at 180° C. | 13' |
| 160° C. | 25' 40" |
| viscosity at | |

TABLE 1c-continued

Testing of the build-up of viscosity in solution.

| 25° C. (mPa s) after X days' storage at 25° C. | |
|---|---|
| X = 0 | 195 |
| X = 90 | 195 |

EXAMPLE 1A

It is shown in Table 1A that also other epoxide resins can be used in place of the liquid unmodified epoxide resin based on bisphenol-A without losing the high storage stability. The cyanoacetyl compound used was neopentyl glycol-bis-cyanoacetic ester, and the accelerator used was monuron.

Epoxide resin 1

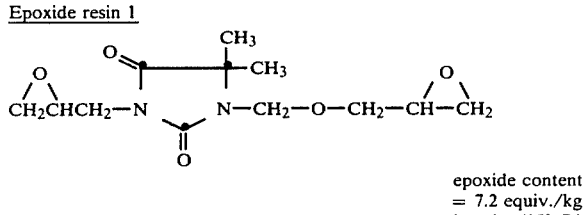

epoxide content = 7.2 equiv./kg
viscosity (25° C.) = 1500 mPa s

Epoxide resin 2

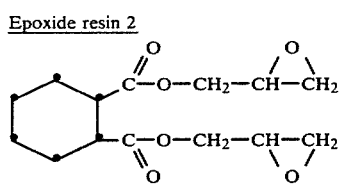

epoxide content = 6.0 equiv./kg
viscosity (25° C.) = 800 mPa s

Epoxide resin 3

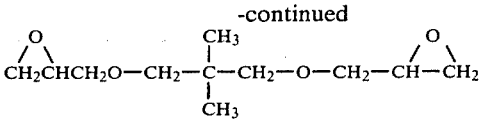

epoxide content = 8.13 equiv./kg
viscosity (25° C.) = ~10 mPa s

Epoxide resin 4
advancement resin from bisphenol-A-epoxy compound and bisphenol-A epoxide content = 2.4 equiv./kg
softening range 35 ~35° C.

TABLE 1A

| resin component | 1 | 2 | 3 | 4 |
|---|---|---|---|---|
| curing agent component | neopentyl glycol-bis-cyanoacetic ester | | | |
| amount of curing agent (phr) | 28.6 | 23.8 | 32.3 | 9.5 |
| accelerator | monuron | | | |
| accelerator (phr) | 2 | 2 | 2 | 1 |
| gelling time at 180° C. | 46' | 16'50" | 41' | 24' |
| gelling time at 160° C. | 1h 13' | 43'30" | 3h 55' | 40' |
| gelling time at 140° C. | 1h 30' | 1h 25' | | 1h 15' |
| viscosity at 25° C. after X days' storage at 25° C. | | | | sofening range |
| X = 0 | 1350 | 675 | <70 | <40° C. |
| (mPa s) X = 90 | 1440 | 765 | <70 | <40° C. |
| X = 150 | 1650 | 1200 | <70 | <40° C. |
| curing | 4h 180° C. + 6h 120° C. | 4h 80° C. + 6h 120° C. | 6h 120° C. + 6h 180° C. | 6h 120° C. + 6h 180° C. |
| glass transition temperature (differential thermoanalysis) | 117° C. | 80° C. | 48° C. | 104° C. |
| tensile strength on Anticorodal (N/mm²) DIN 53183 | 10.4 | 6.3 | 17.3 | 24.7 |

EXAMPLE 2

Instead of neopentyl glycol-bis-cyanoacetic ester, the curing agent used is in this case cyanoacetic acid-N-isobutylamide. With this relatively low-melting and readily soluble cyanoacetic acid derivative too, there is obtained, together with N-chlorophenyl-N',N'-dimethylurea as accelerator, a favourable reactivity/storage stability ratio and, after curing, a favorable pattern of properties in moulded materials and films is shown. The corresponding test results are summarised in the Tables 2a and 2b.

It has been demonstrates by way of comparison that with use of compounds customarily used as accelerators, such as benzyldimethylamine and 1-methylimidazole, the storage stability is considerably lower. For comparison, there are used amounts of accelerator which, with regard to the gelling time at 180° C., correspond to the amount of 2 phr of monuron:

| viscosity in mPa s | 0.45 phr of benzyl-dimethylamine | 0.15 phr of 1-methylimidazole |
|---|---|---|
| viscosity at 25° C. | 2850 | 2400 |
| viscosity after 3 days at 25° C. | solid, m.p. 56° C. | 6525 |
| viscosity after 30 days at 25° C. | solid, m.p. 56° C. | solid, m.p. 55° C. |

TABLE 2a

Effect of increasing proportions of accelerator on the reactivity and storage stability of a mixture of epoxide resin and cyanoacetic acid-N-isobutylamide.

| resin component | epoxide based on bisphenol-A as in Table 1a | |
|---|---|---|
| curing agent component | 25.2 phr of cyanoacetic acid-N-isobutylamide | without |
| accelerator | N-p-chlorophenyl-N',N'-dimethylurea (monuron) | |

TABLE 2a-continued

Effect of increasing proportions of accelerator on the reactivity and storage stability of a mixture of epoxide resin and cyanoacetic acid-N-isobutylamide.

| amount of accelerator(phr) | — | 0.5 | 1 | 2 | 7.5 | 2 |
|---|---|---|---|---|---|---|
| gelling time at 180° C. | 2h | 25 min. | 20 min. | 24 min. | 8 min. | 1h 55 min. |
| gelling time at 120° C. | | 2h 50 min. | 1h 30 min. | 63 min. | 30 min. 40 sec. | |
| viscosity at 25° C. | 5600 | 2325 | 2250 | 2400 | 2635 | 10530 |
| viscosity at 25° C. (mPa s) after X days' storage at 25° C. | | | | | | |
| X = 3 | | | | 2400 | | |
| X = 10 | 5600 | 2175 | 2325 | 2400 | 2850 | 11570 |
| X = 30 | 5600 | 2175 | 2325 | 2475 | 7650 | 12740 |
| X = 60 | 5600 | 2175 | 2475 | 2925 | | 14430 |

TABLE 2b

Effect of increasing proportions of accelerator on the properties of moulded materials and films from a combination of epoxide resin and cyanoacetic acid-N-isobutylamide.

| | | | |
|---|---|---|---|
| resin component | epoxide resin based on bisphenol-A (as in Table 1a) | | |
| curing agent component | 21.5 phr of cyanoacetic acid-N-isobutylamide | | |
| accelerator | N-p-chlorophenyl-N',N'-dimethylurea | | |
| amount of accelerator (phr) | 0.5 | 2 | 7.5 |
| curing agent | 4h at 80° C. + 6h at 120° C. | | |
| dimensional stability under heat (ISO-75) | 131° C. | 109° C. | 102° C. |
| glass transition temp. (differential thermoanalysis) | 141° C. | 123° C. | 106° C. |
| impact bend strength kJ/m$^2$ (VSM standard 77105) | 54 | 66 | 22 |
| bend strength N/mm$^2$ (VSM standard 77103) | 97 | 86 | 82 |
| flexural strength mm (VSM standard 77103) | 15.5 | 16.7 | 14.5 |
| tensile shearing strength on Anticorodal N/mm$^2$ (DIN 53183) | 17.2 | 18.3 | 16.6 |
| increase in weight after 4 days' storage in water at 25° C. | 0.39% | 0.37% | 0.45% |
| Appearance after curing in a thin film on glass | glossy film | glossy film | glossy film |
| *resistance of thin films to chemicals: 5 N H$_2$SO$_4$ | 1 | 1 | |
| 5 N NaOH | 1 | 1 | |
| H$_2$O | 1 | 1 | |
| acetone | 2 | 2 | |

*for evaluation see Table 1b

EXAMPLE 3

N-p-Chlorophenyl-N',N'-dimethylurea as accelerator, in combination with a whole series of cyanoacetic acid derivatives used as curing agents, results in a very favourable ratio between gelling time at elevated temperature and long storage stability at room temperature. The most important data are summarised in Table 3a.

The systems have very high storage stability also in combination with solvent (see Table 3b).

TABLE 3a

Cyanoacetyl compounds of differing structure

| resin component | 100 parts by weight of epoxide resin based on bisphenol-A (as in Table 1a) | | | | | |
|---|---|---|---|---|---|---|
| cyanoacetyl compound* | 25.2 parts of B | 21.5 parts of A | 22.7 parts of C | 25 parts of D | 40.5 parts of E | 20.3 parts of F |
| accelerator | 2 phr of monuron | | | | | |
| gelling time at 180° C. | 14 min. | 15 min. | 13 min. | 11 min. | 30 min. | 42 min. |
| gelling time at 120° C. | 1h 05 min. | 2h 30 min. | 2h 35 min. | 1h 40 min. | 4h 10 min. | 2h 50 min. |
| viscosity at 25° C. (mPa s) | 2400 | 5720 | 2500 | 8000 | 57'500 | 450 |
| viscosity at 25° C. (mPa s) after X days' storage at 25° C. | | | | | | |
| X = 10 | 2400 | 5720 | 2700 | 9000 | 65'200 | 450 |
| X = 30 | 2475 | 5070 | 4000 | 15000 | 76'500 | 450 |
| X = 60 | 2925 | 4400 | 4000 | | 83'000 | 580 |

TABLE 3a-continued

| Cyanoacetyl compounds of differing structure | | | |
|---|---|---|---|
| X = 90 | 4000 | 88'500 | 525 |

*The equivalent amount is calculated as follows: ⅓ equiv. of CN/1 equiv. of epoxide. The designations correspond to those given with regard to the production of the cyanoacetyl compounds.

TABLE 3b

| Cyanoacetyl compounds of differing structure in a system containing solvent. | | |
|---|---|---|
| Resin component | 100 parts of epoxide resin based on bisphenol-A, as in Table 1a | |
| cyanoacetyl compound* | 25 parts of D | 40.5 parts of E |
| accelerator | 2 phr of monuron | |
| methyl ethyl ketone | 20 phr | |
| viscosity at 25° C. in mPa s after X days' storage at 25° C. | | |
| X = 0 | 200 | 130 |
| X = 30 | 210 | 130 |

*The amount used is calculated as follows: ⅓ equiv. of CN/1 equiv. of epoxide. The designations correspond to those given under the section dealing with the production of cyanoacetyl compounds.

EXAMPLE 4

Using a combination of a liquid unmodified bisphenol-A epoxide resin and neopentyl glycol-bis-cyanoacetic ester as well as a combination of the same resin and cyanoacetic acid-N-isobutylamide, it is shown (Table 4) that the N-p-chlorophenyl-N',N'-dimethylurea used as accelerator in the preceding Examples can be readily replaced by N-p-ethoxyphenyl-N',N'-dimethylurea (comparative values: see Tables 1a and 1b, as well as Tables 2a and 2b),

TABLE 4

Accelerator effect of N-p-ethoxyphenyl-N',N'-dimethylurea on the combination of liquid unmodified epoxide resins based on bisphenol A (epoxide content: 5.4 equive./kg, viscosity at 25° C.: 10,500 mPa s) and curing agent.

| curing agent component | 21.5 phr of neopentyl-glycol-bis-cyanoacetic ester | 25.2 phr of cyanoacetic acid-N-isobutylamide |
|---|---|---|
| amount of accelerator | 5 phr | 7.5 phr |
| gelling time at 180° C. | 6 min. 10 sec. | 8 min. 30 sec. |
| gelling time at 120° C. | 80 min. | 25 min. 30 sec. |
| *after curing for 4 hours at 80° C. and 6 hours at 120° C.* | | |
| dimensional stability under heat (ISO 150-75) | 103° C. | 90° C. |
| glass transition temperature (differential thermoanalysis) | 120° C. | 101° C. |
| impact bend strength kJ/m$^2$ (VSM standard 77105) | 23.3 | 30.8 |
| bend strength N/mm$^2$ (VSM standard 77103) | 111 | 90.9 |
| flexural strength (VSM standard 77103) | 13 | 12.5 |
| tensile shearing strength on Anticorodal N/mm$^2$ (DIN 53183) | 14 | 19.2 |
| increase in weight after 4 days' storage in water at 25° C. | 0.45% | 0.41% |

EXAMPLE 5

The Tables 5a and 5b show the effect of different accelerators, of which the amount in the mixture corresponds to the content of tertiary nitrogen of 2 parts by weight of monuron (see the corresponding values in the Tables 1a and 2a). The employed epoxide resin corresponds to that used in Example 1. The following monuron-similar compounds are used as accelerators:

| | Melting point |
|---|---|
| I: CH₃CH₂—O—⟨ring⟩—NH—C(=O)—N(CH₃)(CH₃) | 137–138° C. |
| II: H₃C\N—C(=O)—NH—⟨ring⟩—CH₃ with NH—C(=O)—N(CH₃)(CH₃) / H₃C | 175–185° C. |
| III: H₃C\N—C(=O)—NH—⟨ring⟩—CH₂—⟨ring⟩—NH—C(=O)—N(CH₃)(CH₃) / H₃C | 224–226° C. |

-continued

| | | Melting point |
|---|---|---|
| IV: | H₃C—CH₂—CH₂—CH₂\\N—C—NH—⟨aryl-CH₃⟩—NH—C—N/CH₂—CH₂—CH₂—CH₃ (di-butyl substituted bis-urea on tolyl) | 108–110° C. |
| V: | ⟨2-Cl, 4-CH₃-phenyl⟩—NH—C(O)—N(CH₃)₂ | 224–226° C. |
| VI: | ⟨2-Cl, 4-C₂H₅-phenyl⟩—NH—C(O)—N(CH₃)₂ | 130–132° C. |
| VII: | ⟨2-CF₃-phenyl⟩—NH—C(O)—N(CH₃)₂ | 192–193° C. |
| VIII: | ⟨2-NO₂, 4-CH₃-phenyl⟩—NH—C(O)—N(CH₃)₂ | 110–113° C. |
| IX: | ⟨2,4-di-Cl-phenyl⟩—NH—C(O)—N(CH₃)₂ | 158–159° C. |
| X: | ⟨phenyl⟩—NH—C(O)—N(piperidinyl) | 173–174° C. |
| XI: | ⟨2-CF₃-phenyl⟩—NH—C(O)—N(CH₃)₂ | 163–164,5° C. |
| XII: | ⟨phenyl⟩—NH—C(O)—N(CH₃)₂ | 134° C. |

TABLE 5a

Acceleration with neopentyl glycol-bis-cyanoacetic ester as curing agent 100 parts of epoxide resin based on bisphenol-A (as in Table 1a) and 21.5 parts of neopentyl glycol-bis-cyanoacetic ester

| System | I 2.1 | II 1.3 | III 1.7 | IV 2.2 | V 2.1 | VI 2.3 | VII 2.3 | VIII 2.2 | IX 2.3 | X 2.0 | XI 2.3 | XII 1.6 |
|---|---|---|---|---|---|---|---|---|---|---|---|---|
| accelerator phr | | | | | | | | | | | | |
| gelling time at 180° C. (min.) | 12 | 17 | 15 | 64 | 13 | 14 | 16 | 13 | 17 | 26 | 15 | 14 |
| gelling time at 120° C. (min.) | 158 | 255 | 180 | 480 | 138 | 180 | 220 | 160 | 210 | 250 | 228 | 192 |
| viscosity at 25° C. (mPa s) | 5850 | 6600 | 7200 | 6075 | 5625 | 5625 | 5625 | 6225 | 6000 | 6000 | 5950 | 5600 |
| viscosity at 25° C. (mPa s) after X days' storage at 25° C.: | | | | | | | | | | | | |
| X = 10 | 5925 | 6750 | 6900 | 5850 | 6450 | 5950 | 6300 | 7820 | 6375 | 6300 | 6650 | 5625 |
| X = 30 | 6600 | 6750 | 6900 | | 7200 | 6550 | 6375 | 9150 | 6600 | 6450 | 6675 | 5775 |
| X = 60 | | | | | 9375 | 7500 | 6900 | | 7125 | 7650 | | 6150 |
| X = 90 | 8650 | 7000 | 7800 | 6000 | | 9150 | | | 7875 | | 6825 | 6525 |
| X = 150 | | | | | | | | 8025 | 13200 | | 9600 | 12525 |
| X = 230 | | 8175 | | | | | | | | | | |
| curing | 4 h 80° C. + 6 h 120° C. | | | | | | | | | | | |
| glass transition temperature (differential thermoanalysis)(°C.) | 118 | 120 | 116 | 133 | 127 | 131 | 126 | 126 | 127 | 123 | 128 | 127 |
| tensile shearing strength on Anticorodal (N/mm²) | 14.8 | 14.1 | 15.8 | | 14.3 | 15.8 | 17.2 | 16.2 | 15.2 | 13.8 | 16.5 | 15.9 |

TABLE 5b

| Acceleration with cyanoacetic acid-N-isobutylamide | | | | | |
|---|---|---|---|---|---|
| System | 100 parts of epoxide resin based on bisphenol-A (as in Table 1a) and 25.5 parts of cyanoacetic acid-N-isobutylamide | | | | |
| accelerator, phr | I 2.1 | II 1.3 | III 1.7 | IV 2.2 | XII 1.6 |
| gelling time at 180° C. (min.) | 12 | 13 | 15 | 160 | 12¾ |
| gelling time at 120° C. (min.) | 56 | 53 | 78 | 380 | 68 |
| viscosity at 25° C. (mPa s) | 2700 | 2625 | 2775 | 2550 | 2250 |
| viscosity at 25° C. (mPa s) after X days' storage at 25° C. | | | | | |
| X = 10 | 2700 | 2625 | 2775 | 2625 | 2325 |
| X = 30 | | 3450 | 3150 | 2625 | 2455 |
| X = 60 | | | | 3525 | 3975 |
| X = 90 | | | 6375 | | |
| curing | | | | 4h 80°+ 6h 128°+ 6h 180° C. | |
| glass transition temperature (°C.) (differential thermoanalysis) | 125 | 125 | 124 | 120 | 123 |
| tensile shearing strength on Anticorodal (N/mm$^2$) | 20.0 | 18.6 | 17.7 | | 22.2 |

EXAMPLE 6

In Table 6 are compared three formulations, with regard to gelling time at elevated temperature, storage stability at room temperature and appearance of moulded materials produced therewith, with known combinations which are all based on the same liquid unmodified epoxide resin from bisphenol-A, and which are designated as being storage-stable one-component systems or formulations having a very long service life.

Compared with the combination cured with a BF$_3$ ethylamine complex, the formulations according to the invention are distinguished by a viscosity which is advantageously lower for many applications, and by better storage stability. The initial viscosity is likewise clearly reduced compared with that of the formulation with a BCl$_3$ amine complex. The use of liquid methyltetrahydrophthalic acid anhydride as curing agent and benzyldimethylamine as accelerator does mean a somewhat lower initial viscosity, but the storage stability is completely inadequate for use as a one-component system. When the benzyldimethylamine is replaced with monuron, the storage stability is indeed improved; however, the moulded materials after curing exhibit fine blistering. Such inhomogeneity impairs the mechanical properties and prevents the application of the moulded materials as electrical insulating material in high-voltage systems.

Finally, if the curing agent components according to the invention are replaced with cyanoacetamide, the temperature has to be raised to about 100° C. in the production of the resin/curing agent/accelerator mixture in order to get the curing agent component into solution. On cooling, cyanoacetamide is already precipitating at 90° C.; it is therefore not possible to obtain with cyanoacetamide a one-component system which is homogeneous at room temperature. The insolubility of the curing agent accordingly leads to difficulties similar to those already described for combinations of epoxide resin, dicyanodiamide and for example monuron: the curing agent on storage and during the curing process precipitates to a greater or lesser degree, which again results in inhomogeneous moulded materials having inadequate properties.

TABLE 6

| Comparison with known resin/curing agent and optionally accelerator combinations | | | | | | |
|---|---|---|---|---|---|---|
| resin component | liquid unmodified epoxide resin based on bisphenol-A, as in Table 1a | | | | | |
| curing agent component | neopentyl glycol-bis-cyanacetic ester(21.5 phr) | cyanoacetic acid-N-iso-butylamide (25.2 phr) | cyanoacetic acid-N-iso-butylamide (25.2 phr) | BF$_3$ ethyl-amine complex (3 phr) | BCl$_3$ octyl-amine complex | methyl-tetrahydrophthalic acid anhydride (76 phr) |
| accelerator | "monuron" (7.5 phr) | "monuron" (2 phr) | "monuron" (5 phr) | — | — | benzyldimethylamine (0.1 phr) |
| viscosity at 25° C. (mPa s) | 6700 | 2400 | 2500 | 76 000 | 21 500 | 1 050 |
| gelling time at 120° C. | 70 min. | 65 min. | 35 min. | 63 min. | 34 min. | 51 min. |
| time until initial viscosity is doubled | about 10 weeks | about 10 weeks | | about 6 weeks | | 1 day |
| viscosity after 8 weeks' storage at 25° C. (mPa s) | | 2925 | | 220 000 | 25 000 | solid after 6 days |
| appearance of the moulded materials obtained after curing | fully satisfactory | fully satisfactory | fully satisfactory | fully satisfactory | fully satisfactory | fully satisfactory |
| observations | | | | high initial viscosity | | |
| curing agent component | methyl-tetrahydrophthalic acid anhydride (76 phr) | | cyanoacetamide (11.2 phr) | | dicyanodiamide (13 phr) | |

TABLE 6-continued

| Comparison with known resin/curing agent and optionally accelerator combinations | | | |
|---|---|---|---|
| accelerator | "monuron" (1.5 phr) | "monuron" (2 phr) | "monuron" (1 phr) |
| viscosity at 25° C. (mPa s) | 825 | no clear solution | no clear solution |
| gelling time at 120° C. | 180 min. | | 28.5 min. |
| time until initial viscosity is doubled | ~25 days | | more than 6 weeks |
| viscosity after 8 weeks storage at 25° C. (mPa s) | 4600 | | |
| appearance of moulded materials obtained after curing | interspersed with fine blisters | inhomogeneous | inhomogeneous severe settling out of curing agent |

What is claimed is:

1. A homogeneous mixture of epoxide resin, curing agent for the resin, and curing accelerator, which mixture contains
   (a) an epoxide resin having on average more than one epoxide group in the molecule,
   (b) as curing agent for the epoxide resin, a cyanoacetyl compound dissolved in the resin, which compound has a melting point (m.p.) below 120° C. and corresponds to the formula I $$(N\equiv C-CH_2-\overset{O}{\underset{\|}{C}}-)_n-R \qquad (I)$$

wherein R is the radical of a mono- to tetravalent alcohol or amine having a partial molecular weight of $\leq 2000$, which radical is formed by removal of 1 to 4 hydroxyl hydrogen atoms or amine hydrogen atoms, and n is a number from 1 to 4 inclusive, the amount of (b) being such that to 1 —CH$_2$—C≡N group there are 3-4 epoxide groups of the component (a), and
   (c) as curing accelerator, to 100 parts by weight of epoxide resin 0.1 to 10 parts by weight of a phenylurea derivative of the formula II

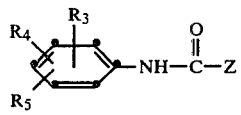

in which Z is the group

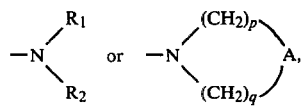

wherein A is —CH$_2$— or N, p is 0, 1 or 2, and q is 1 or 2, and R$_1$ and R$_2$ independently of one another are each an alkyl group having 1 to 4 carbon atoms, and wherein R$_3$ and R$_4$ independently of one another are each hydrogen, halogen, alkyl having 1 to 4 carbon atoms, alkoxy having 1 to 4 carbon atoms, or a substituted or unsubstituted phenyl or phenoxy group, and R$_5$ is hydrogen, trifluoromethyl, nitro or one of the groups

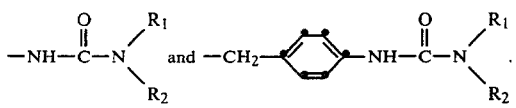

2. A mixture according to claim 1, which contains a liquid epoxide resin as component (a).

3. A mixture according to claim 2, which contains an epoxide resin based on bisphenol A or F, on a polyvalent aliphatic alcohol or on an aromatic mono- or polyamine.

4. A mixture according to claim 1, which contains as component (b) a compound of the formula I wherein n is the number 1 or 2.

5. A mixture according to claim 1, which contains as component (c) 0.1 to 5 parts by weight of a compound of the formula I$_1$ wherein Z is the group

R$_1$ and R$_2$ independently of one another are each methyl or ethyl, R$_3$ and R$_4$ independently of one another are hydrogen, halogen, alkyl having 1 to 4 carbon atoms or alkoxy having 1 to 4 carbon atoms, and R$_5$ is hydrogen or trifluoromethyl.

6. A mixture according to claim 5, which contains as component (c) N-p-chlorophenyl-N',N'-dimethylurea, N-p-ethyloxyphenyl-N',N'-dimethylurea or N-p-trifluoromethylphenyl-N',N'-dimethylurea.

7. A mixture according to claim 5, which contains as component (c) N-p-chlorophenyl-N',N'-dimethylurea or N-p-ethyloxyphenyl-N',N'-dimethylurea.

8. A mixture according to claim 4, which contains as component (b) neopentyl glycol-bis-cyanoacetic acid ester or cyanoacetic acid-N-isobutylamide.

9. A mixture according to claim 1, which contains an unmodified epoxide resin based on bisphenol-A as component (a), neopentyl glycol-bis-cyanoacetic ester as component (b) and N-p-chlorophenyl-N',N'-dimethylurea as component (c).

10. A mixture according to claim 1, which contains an unmodified epoxide resin based on bisphenol-A as component (a), neopentyl glycol-bis-cyanoacetic ester as component (b), and N-p-ethyloxyphenyl-N',N'-dimethylurea as component (c).

11. A mixture according to claim 1, which contains an unmodified epoxide resin based on bisphenol-A as component (a), neopentyl glycol-bis-cyanoacetic ester as component (b), and N-p-trifluoromethylphenyl-N',N'-dimethylurea as component (c).

12. A mixture according to claim 1, which contains an unmodified epoxide resin based on bisphenol-A as component (a), cyanoacetic acid-N-isobutylamide as component (b), and N-chlorophenyl-N',N'-dimethylamide as component (c).

13. A mixture according to claim 1, which contains an unmodified epoxide resin based on bisphenol-A as component (a), cyanoacetic acid-N-isobutylamide as component (b), and N-p-ethyloxyphenyl-N',N'-dimethylurea as component (c).

* * * * *